US009626985B2

(12) United States Patent
Cao et al.

(10) Patent No.: US 9,626,985 B2
(45) Date of Patent: Apr. 18, 2017

(54) AUDIO PROCESSING METHOD AND APPARATUS

(71) Applicant: TENCENT TECHNOLOGY (SHENZHEN) COMPANY LIMITED, Shenzhen (CN)

(72) Inventors: Muyong Cao, Shenzhen (CN); Junming Li, Shenzhen (CN); Xingping Long, Shenzhen (CN); Guangfa Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 15/036,926

(22) PCT Filed: Oct. 21, 2014

(86) PCT No.: PCT/CN2014/089004
§ 371 (c)(1),
(2) Date: May 16, 2016

(87) PCT Pub. No.: WO2015/070691
PCT Pub. Date: May 21, 2015

(65) Prior Publication Data
US 2016/0267919 A1 Sep. 15, 2016

(30) Foreign Application Priority Data
Nov. 15, 2013 (CN) .......................... 2013 1 0573180

(51) Int. Cl.
G10L 21/02 (2013.01)
G10L 21/0208 (2013.01)
(Continued)

(52) U.S. Cl.
CPC ........ *G10L 21/0208* (2013.01); *G10L 19/167* (2013.01); *G10L 21/0202* (2013.01);
(Continued)

(58) Field of Classification Search
CPC ... H04L 12/2665; H04L 43/087; H04L 47/10; H04N 21/439; H04N 21/4392; H04N 21/4394; H04J 3/0632
See application file for complete search history.

(56) References Cited

U.S. PATENT DOCUMENTS 4,641,253 A * 2/1987 Mastran ................. G06F 3/002
348/515
5,481,267 A * 1/1996 Miyabe .............. H03H 17/0628
341/61

(Continued)

FOREIGN PATENT DOCUMENTS

CN 1949879 A 4/2007
CN 101583025 A 11/2009

(Continued)

OTHER PUBLICATIONS

The World Intellectual Property Organization (WIPO) International Search Report for PCT/CN2014/089004 Feb. 3, 2015.

*Primary Examiner* — Eric Yen
(74) *Attorney, Agent, or Firm* — Anova Law Group, PLLC

(57) ABSTRACT

Audio processing methods and apparatus are provided. An audio processing method may include: receiving audio data packets; buffering the audio data packets to a buffer; reading the audio data packets from the buffer and playing the audio data packets; accumulating an actual total playing time length and a total sampling time length of the audio data packets that currently have been read from the buffer and have been played; and suspending reading and playing, when a sum of sampling time lengths of audio data packets (Continued)

that are buffered and unread in the buffer is less than or equal to a first threshold, until a sum of sampling time lengths of the audio data packets in the buffer that are unread is greater than or equal to a current network jitter estimated value.

14 Claims, 5 Drawing Sheets

(51) Int. Cl.
    *G10L 19/16*     (2013.01)
    *H04J 3/06*     (2006.01)
    *H04L 12/801*     (2013.01)
    *H04L 12/26*     (2006.01)
    *H04N 21/439*     (2011.01)

(52) U.S. Cl.
    CPC ........ *H04J 3/0632* (2013.01); *H04L 12/2665* (2013.01); *H04L 43/087* (2013.01); *H04L 47/10* (2013.01); *H04N 21/439* (2013.01); *H04N 21/4392* (2013.01); *H04N 21/4394* (2013.01)

(56) References Cited

U.S. PATENT DOCUMENTS

| | | | | |
|---|---|---|---|---|
| 6,167,054 | A * | 12/2000 | Simmons | G06F 13/1605 370/412 |
| 6,212,206 | B1 * | 4/2001 | Ketcham | H04J 3/0632 348/E7.083 |
| 6,252,919 | B1 * | 6/2001 | Lin | G10L 21/04 375/355 |
| 6,259,677 | B1 * | 7/2001 | Jain | H04J 3/0632 370/252 |
| 6,411,925 | B1 * | 6/2002 | Keiller | G10L 15/20 704/200 |
| 6,473,398 | B1 * | 10/2002 | Wall | H04L 41/06 370/229 |
| 6,721,820 | B2 * | 4/2004 | Zilberman | G06F 13/28 710/22 |
| 7,197,072 | B1 * | 3/2007 | Hsu | H04N 21/23406 375/240.02 |
| 7,301,905 | B1 * | 11/2007 | Tontiruttananon | H04L 47/10 370/232 |
| 8,018,851 | B1 * | 9/2011 | Medina | H04L 47/10 370/235 |
| 2002/0128788 | A1 * | 9/2002 | Weickert | G06F 3/0613 702/79 |
| 2003/0193619 | A1 * | 10/2003 | Farrand | H04N 21/6582 348/731 |
| 2003/0198184 | A1 * | 10/2003 | Huang | H04L 1/0002 370/231 |
| 2004/0008715 | A1 * | 1/2004 | Barrack | H04L 12/5693 370/429 |
| 2004/0057383 | A1 * | 3/2004 | Tseng | H04L 43/087 370/252 |
| 2004/0193762 | A1 * | 9/2004 | Leon | H04L 29/06027 710/52 |
| 2004/0204945 | A1 * | 10/2004 | Okuda | G10L 21/04 704/500 |
| 2004/0257856 | A1 * | 12/2004 | Liu | G06F 5/10 365/154 |
| 2005/0089043 | A1 * | 4/2005 | Seckin | H04L 41/5006 370/395.21 |
| 2005/0204052 | A1 * | 9/2005 | Wang | H04L 29/06027 709/231 |
| 2005/0259947 | A1 * | 11/2005 | Wang | H04L 41/5038 386/203 |
| 2007/0116435 | A1 * | 5/2007 | Kim | G10L 19/167 386/241 |
| 2007/0204056 | A1 * | 8/2007 | Deshpande | H04N 21/44004 709/231 |
| 2007/0286579 | A1 * | 12/2007 | Murabayashi | G11B 27/28 386/241 |
| 2008/0052624 | A1 * | 2/2008 | Roberts | H04N 5/4403 715/716 |
| 2008/0175276 | A1 * | 7/2008 | Lakaniemi | H04J 3/0632 370/516 |
| 2008/0192633 | A1 * | 8/2008 | Ahn | H04L 47/266 370/231 |
| 2010/0290454 | A1 * | 11/2010 | Lundberg | H04J 3/0632 370/352 |
| 2014/0369222 | A1 * | 12/2014 | Kim | H04L 65/4076 370/252 |
| 2015/0319212 | A1 * | 11/2015 | Mani | H04L 47/34 370/352 |
| 2015/0332704 | A1 * | 11/2015 | Sun | H04M 9/082 704/227 |
| 2015/0350099 | A1 * | 12/2015 | Sun | H04L 65/80 370/412 |
| 2016/0234088 | A1 * | 8/2016 | Kruger | H04J 3/0632 |

FOREIGN PATENT DOCUMENTS

| | | |
|---|---|---|
| CN | 103594103 A | 2/2014 |
| WO | 0201878 A1 | 1/2002 |

* cited by examiner

AUDIO PROCESSING METHOD AND APPARATUS

This application claims priority to of PCT Application No. PCT/CN2014/089004, filed on Oct. 21, 2014, which claims priority to a Chinese patent application No. 201310573180.8, filed on Nov. 15, 2013, the content of all of which is incorporated herein by reference in its entirety.

FIELD OF THE TECHNOLOGY

The present disclosure generally relates to the field of network technologies, and in particular, relates to an audio processing method and a related apparatus.

BACKGROUND OF THE DISCLOSURE

An audio network jitter may refer to a delay and/or change degree when audio data packets are transmitted in a network. Because congestion may occur in the network, a queuing delay affects an end-to-end delay, audio data packets transmitted through a same connection are caused to have different delays, and a disorder may occur in the audio data packets, thereby causing poor user experience due to a stalling or noise during audio playing.

A network jitter may occur during network transmission of audio data packets sent by an audio source (that is, an audio producer), thereby causing poor user experience due to a stalling and a delay on an audio playing terminal (that is, an audio consumer). Therefore, in the existing technology, audio data packets of a long time length (for example, 3 seconds) are buffered to eliminate impact of the network jitter on audio playing, which can ensure fluency of the audio playing to certain extent.

Problems arise in the existing technology, however, when audio data packets of a fixed long time length are buffered to eliminate impact of a network jitter on fluency of audio playing, a large delay may be caused before an audio receiving user hears the sound, because the time length of the buffered audio data packets is generally long.

SUMMARY

Embodiments of the present disclosure provide an audio processing method and a related apparatus, so as to greatly eliminate impact of a network jitter on fluency of audio playing and on a sound playing delay.

One embodiment of the present disclosure provides an audio processing method, which may include:
  receiving audio data packets;
  buffering the audio data packets to a buffer;
  reading the audio data packets from the buffer and playing the audio data packets;
  accumulating an actual total playing time length and a total sampling time length of the audio data packets that currently have been read from the buffer and have been played; and
  suspending reading and playing, when a sum of sampling time lengths of the audio data packets that are buffered and unread in the buffer is less than or equal to a first threshold, until a sum of sampling time lengths of audio data packets in the buffer that are unread is greater than or equal to a current network jitter estimated value, the current network jitter estimated value being obtained based on the accumulated actual total playing time length and the accumulated total sampling time length.

Another embodiment of the present disclosure provides a terminal device, including:
  a receiving and buffering unit, configured to receive audio data packets and buffer the audio data packets to a buffer;
  a reading and playing unit, configured to read the audio data packets from the buffer and play the audio data packets;
  an accumulating unit, configured to accumulate an actual total playing time length and a total sampling time length of the audio data packets that currently have been read from the buffer and have been played; and
  a buffering and playing unit, configured to suspend reading and playing when a sum of sampling time lengths of the audio data packets that are buffered and unread in the buffer is less than or equal to a first threshold, until a sum of sampling time lengths of the audio data packets in the buffer that are unread is greater than or equal to a current network jitter estimated value, the current network jitter estimated value being obtained based on the accumulated actual total playing time length and the accumulated total sampling time length.

It can be seen that, in technical solutions in the embodiments of the present disclosure, an actual total playing time length and a total sampling time length of audio data packets that currently have been read from a buffer and played are accumulated; and reading and playing are suspended when a sum of sampling time lengths of audio data packets that are buffered and unread in the buffer is less than or equal to a first threshold, until a sum of sampling time lengths of audio data packets in the buffer that are unread is greater than or equal to a current network jitter estimated value, the current network jitter estimated value being obtained based on the accumulated actual total playing time length and the accumulated total sampling time length.

Because an actual total playing time length and a total sampling time length of the audio data packets that currently have been received and read (from a buffer) and played are accumulated, and a current network jitter estimated value is obtained based on the current accumulated actual total playing time length and the current accumulated total sampling time length, a sum of sampling time lengths buffered during audio buffering is greater than or equal to the current network jitter estimated value.

Because the network jitter estimated value fully takes a network delay cumulative effect into account, and the network jitter estimated value dynamically changes with the current accumulated actual total playing time length and the current accumulated total sampling time length, it is found through actual practice that, compared with an existing mechanism of buffering according to a fixed time length, such a mechanism helps eliminate impact of a network jitter on fluency of audio playing and on a sound playing delay, and obtains desirable playing experience.

BRIEF DESCRIPTION OF THE DRAWINGS

To describe the technical solutions in the embodiments of the present disclosure or in the existing technology more clearly, the following briefly introduces the accompanying drawings required for describing the embodiments or the existing technology. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Embodiments of the present disclosure provide an audio processing method and a related apparatus, so as to eliminate impact of a network jitter on fluency of audio playing and a sound playing delay as far as possible.

To make a person skilled in the art understand the technical solutions in the present disclosure better, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Detailed descriptions are made below separately.

In the specification, claims, and accompanying drawings of the present disclosure, the terms "first", "second", "third", "fourth", and so on (if existing) are intended to distinguish between similar objects rather than describe a specific order. It should be understood that data used in this way can be exchanged in a proper circumstance, so that the embodiments of the present disclosure can be implemented in other orders except those shown in the figures or described herein. Moreover, the terms "include", "contain" and any other variants mean to cover the non-exclusive inclusion. For example, a process, method, system, product, or device that includes a series of steps or units is not necessarily limited to those steps or units, but may include other steps or units not expressly listed or inherent to such a process, method, product, or device.

The present disclosure first provides an embodiment of an audio processing method. An audio processing method may include: receiving audio data packets and buffering the received audio data packets to a buffer (e.g., a buffer region); reading audio data packets from the buffer and playing the audio data packets; accumulating an actual total playing time length and a total sampling time length of audio data packets that currently have been read from the buffer and have been played; and suspending reading and playing when a current sum of sampling time lengths of audio data packets that are buffered and unread in the buffer is less than or equal to a first threshold, until a sum of sampling time lengths of audio data packets in the buffer that are unread is greater than or equal to a current network jitter estimated value, the current network jitter estimated value being obtained based on the accumulated actual total playing time length and the accumulated total sampling time length.

Figure 1:
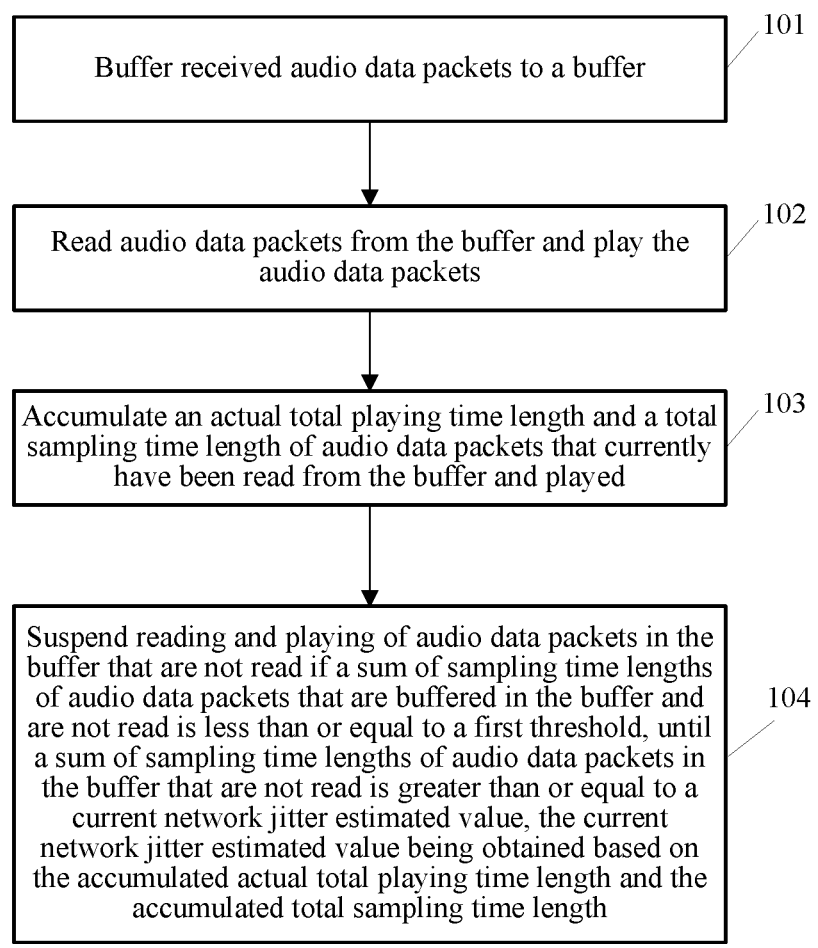
FIG. 1 is a schematic flowchart of an audio processing method according to an embodiment of the present disclosure.

First, referring to FIG. 1, FIG. 1 is a schematic flowchart of an audio processing method according to an embodiment of the present disclosure. As shown in FIG. 1, an audio processing method provided in an embodiment of the present disclosure may include the following content:

101: Receive audio data packets and buffer the received audio data packets to a buffer.

In one embodiment, the step of buffering received audio data packets to a buffer may include: buffering, to the buffer, received audio data packets belonging to a particular audio file (which may be referred to as a first audio file for ease of quotation, where the first audio file may be a live audio file or a non-live audio file).

102: Read the audio data packets from the buffer and play the audio data packets.

In some embodiments of the present disclosure, an audio data packet includes a time sequence number indicating time sequence information thereof. In this case, in step 102, audio data packets in the buffer may be chronologically read according to time sequence numbers of the audio data packets.

An audio data packet may be lost or have a large delay during network transmission. In some embodiments of the present disclosure, at a moment when a particular audio data packet should be played, it is possible that the audio data packet has not been received yet. In this case, in an actual audio processing process, for example, a null data packet or a mute data packet or another data packet may be inserted at the moment of the audio data packet for transition. That is, when a data packet whose time sequence number ranks in the front has not arrived yet, a null packet may be inserted at the position of the packet that has not arrived for playing.

In some other embodiments of the present disclosure, the audio data packet whose time sequence number ranks in the front may arrive at the buffer after the moment when the audio data packet should be played, and in this case, because the playing moment of the audio data packet has passed, the audio data packet may be read from the buffer and directly discarded rather than played. In an alternative embodiment of the present disclosure, an audio data packet that arrives may be identified, and when a playing moment of the audio data packet has passed, the audio data packet may be directly discarded rather than buffered to the buffer.

103: Accumulate an actual total playing time length and a total sampling time length of audio data packets that currently have been read from the buffer and played.

A sampling time length of an audio data packet is a theoretical playing time length of the audio data packet.

In some embodiments of the present disclosure, when a case that a null data packet or a mute data packet is inserted occurs, as described in step 102, because of insertion of, for example, a null packet, a total sampling time length of audio data packets that currently have been read from the buffer and played should be less than an actual total playing time length.

In some embodiments of the present disclosure, the step of accumulating an actual total playing time length and a total sampling time length of audio data packets that currently have been read from the buffer and played may include: accumulating an actual total playing time length within a pre-determined time period from a preset moment to a current moment and a total sampling time length of audio data packets that have been read from the buffer and played within the pre-determined time period.

In some other embodiments of the present disclosure, the step of buffering received audio data packets to a buffer specifically includes: buffering, to the buffer, received audio data packets belonging to a particular audio file. The step of accumulating an actual total playing time length and a total sampling time length of audio data packets that currently have been read from the buffer and played may include: accumulating an actual total playing time length of the first audio file and a total sampling time length of audio data packets that currently have been received and read from the buffer and played and that belong to the first audio file.

In still some other embodiments of the present disclosure, the step of buffering received audio data packets to a buffer specifically includes: buffering, to the buffer, received audio data packets belonging to a particular audio file. The step of accumulating an actual total playing time length and a total sampling time length of audio data packets that currently have been read from the buffer and played may include: accumulating an actual total playing time length of the first audio file within a pre-determined time period from a preset moment to a current moment and a total sampling time length of audio data packets belonging to the first audio file that have been read from the buffer and played within the pre-determined time period.

104: Suspend reading and playing, when a sum of sampling time lengths of audio data packets that are buffered and unread in the buffer is less than or equal to a first threshold, until a sum of sampling time lengths of audio data packets in the buffer that are unread is greater than or equal to a current network jitter estimated value, the current network jitter estimated value being obtained based on the accumulated actual total playing time length and the accumulated total sampling time length.

In some embodiment of the present disclosure, the current network jitter estimated value is equal to a difference (e.g., a difference value) between the accumulated actual total playing time length and the accumulated total sampling time length. In an alternative embodiment, the current network jitter estimated value is equal to a multiplication or product of a jitter risk coefficient β and a difference between the accumulated actual total playing time length and the accumulated total sampling time length.

For example, a value of the jitter risk coefficient β may range from 0.8 to 1.5. Certainly, the value of β may have another range, for example, the value of β may be 1, 1.6, 1.7, 1.8, 2, 2.5, 2.8, 3, or any suitable value.

For example, the first threshold may be equal to 0 second, 1 second, 2 seconds, 3 seconds, 5 seconds, or any suitable value.

In some embodiments of the present disclosure, the jitter risk coefficient β may be determined according to the difference between the accumulated actual total playing time length and the accumulated total sampling time length and/or according to a stalling in audio playing. For example, a larger difference between the accumulated actual total playing time length and total sampling time length indicates a larger jitter risk coefficient β. Alternatively, a smaller difference between the accumulated actual total playing time length and the accumulated total sampling time length indicates a smaller jitter risk coefficient β. Alternatively, a larger difference between the accumulated actual total playing time length and the accumulated total sampling time length indicates a smaller jitter risk coefficient β. Alternatively, a smaller difference between the accumulated actual total playing time length and the accumulated total sampling time length indicates a larger jitter risk coefficient β.

It can be seen that, in this embodiment, an actual total playing time length and a total sampling time length of audio data packets that currently have been read from a buffer and played are accumulated; and reading and playing are suspended when a sum of sampling time lengths of audio data packets that are buffered and unread in the buffer is less than or equal to a first threshold, until a sum of sampling time lengths of audio data packets in the buffer that are unread is greater than or equal to a current network jitter estimated value, the current network jitter estimated value being obtained based on the accumulated actual total playing time length and the accumulated total sampling time length. Because an actual total playing time length and a total sampling time length of audio data packets that currently have been read from a buffer and played are accumulated, and a current network jitter estimated value is obtained based on the current accumulated actual total playing time length and the current accumulated total sampling time length, a sum of sampling time lengths buffered during audio buffering needs to be greater than or equal to the current network jitter estimated value. Because the network jitter estimated value fully considers a network delay cumulative effect, and the network jitter estimated value dynamically changes with the current accumulated actual total playing time length and the current accumulated total sampling time length, it is found through actual practice that, compared with an existing mechanism of buffering according to a fixed time length, such a mechanism helps eliminate impact of accumulative network jitters on fluency of audio playing and on a sound playing delay, and obtains desirable playing experience.

To help better understand and implement the foregoing solutions in this embodiment of the present disclosure, an exemplary description is made below by using some specific examples.

Figure 2:
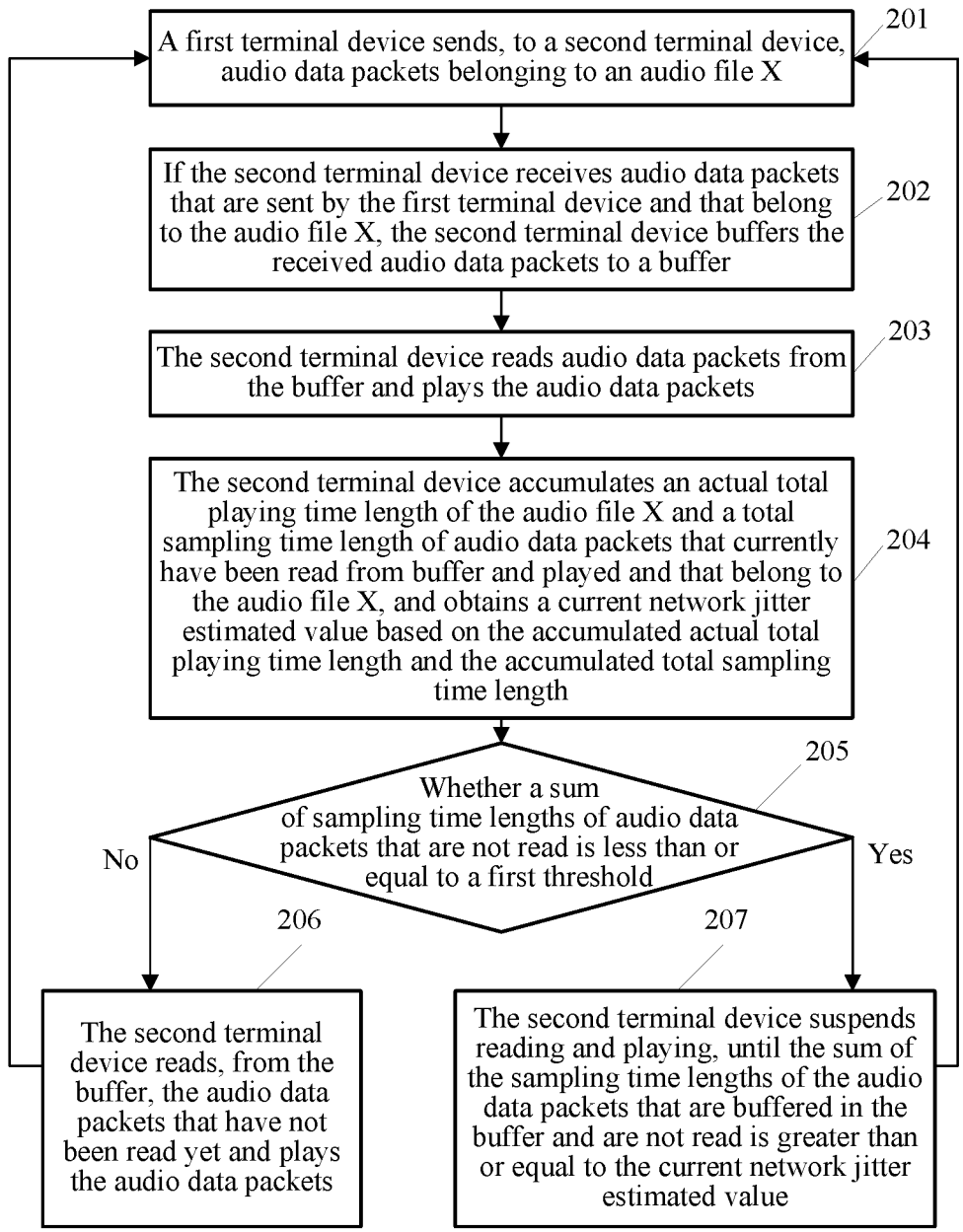
FIG. 2 is a schematic flowchart of another audio processing method according to an embodiment of the present disclosure.

Referring to FIG. 2, FIG. 2 is a schematic flowchart of another audio processing method according to another embodiment of the present disclosure. As shown in FIG. 2, another audio processing method provided in another embodiment of the present disclosure may include the following content:

201: A first terminal device sends, to a second terminal device, audio data packets belonging to an audio file X.

In this embodiment, when a first terminal device needs to, for example, perform instant voice communication or transmit another audio file, by sending audio data packets to a second terminal device, an audio file generally has multiple audio data packets, where the multiple audio data packets may be chronologically sequenced according to sampling moments.

202: When the second terminal device receives audio data packets that are sent by the first terminal device and that belong to the audio file X, the second terminal device buffers the received audio data packets to a buffer.

In some embodiments of the present disclosure, the step of buffering the received audio data packets to a buffer may include: buffering, to the buffer, received audio data packets belonging to a particular audio file (which may be referred to as a first audio file for ease of quotation, where the first audio file may be a live audio file or a non-live audio file).

The terminal devices mentioned in the embodiments of the present disclosure may be computers, mobile phones, computing nodes, personal digital assistant (PDA) devices, or terminal devices of other types.

203: The second terminal device reads audio data packets from the buffer and plays the audio data packets.

In some embodiments of the present disclosure, an audio data packet includes a time sequence number indicating time sequence information thereof. In this case, in step 203, audio data packets in the buffer may be chronologically read according to time sequence numbers of the audio data packets.

An audio data packet may be lost or have a large delay during network transmission. In some possible embodiments of the present disclosure, at a moment when a particular audio data packet should be played, it is possible that the audio data packet has not been received yet. In this case, in an actual audio processing process, for example, a null data packet or a mute data packet or another data packet may be inserted at the moment of the audio data packet for transition. That is, when a data packet whose time sequence number ranks in the front has not arrived yet, a null packet may be inserted at the position of the packet that has not arrived for playing.

In some other embodiments of the present disclosure, the audio data packet whose time sequence number ranks in the front may arrive at the buffer after the moment when the audio data packet should be played, and in this case, because the playing moment of the audio data packet has passed, the audio data packet may be read from the buffer and directly discarded rather than played. In an alternative embodiment of the present disclosure, an audio data packet that arrives may be identified, and when a playing moment of the audio data packet has passed, the audio data packet may be directly discarded rather than buffered to the buffer.

204: The second terminal device accumulates an actual total playing time length of the audio file X and a total sampling time length of audio data packets that currently have been read from buffer and played and that belong to the audio file X, and obtains a current network jitter estimated value based on the accumulated actual total playing time length and the accumulated total sampling time length.

In some embodiments of the present disclosure, the step of accumulating, by the second terminal device, an actual total playing time length of the audio file X and a total sampling time length of audio data packets that currently have been read from buffer and played and that belong to the audio file X may specifically include: accumulating an actual total playing time length of the audio file X within a pre-determined time period from a preset moment to a current moment and a total sampling time length of audio data packets belonging to the audio file X that currently have been received and read from the buffer and played within the pre-determined time period.

In some embodiments of the present disclosure, the step of accumulating, by the second terminal device, an actual total playing time length of the audio file X and a total sampling time length of audio data packets that currently have been read from buffer and played and that belong to the audio file X may specifically include: accumulating an actual total playing time length of the audio file X and a total sampling time length of all audio data packets that currently have been read from the buffer and played and that belong to the audio file X.

In some embodiments of the present disclosure, the current network jitter estimated value is equal to a difference between the accumulated actual total playing time length and the accumulated total sampling time length. In an alternative embodiment, the current network jitter estimated value is equal to a multiplication of a jitter risk coefficient $\beta$ and a difference between the accumulated actual total playing time length and the accumulated total sampling time length.

For example, a value of the jitter risk coefficient $\beta$ may range from 0.8 to 1.5. Certainly, the value of $\beta$ may have another range, for example, the value of $\beta$ may be 1, 1.6, 1.7, 1.8, 2, 2.5, 2.8, 3, or any suitable value.

205: The second terminal device checks whether a sum of sampling time lengths of audio data packets that are buffered and unread in the buffer is less than or equal to a first threshold.

For example, the first threshold may be equal to 0 second, 1 second, 2 seconds, 3 seconds, 5 seconds, or any suitable value.

If not, step 206 is performed.

If yes, step 207 is performed.

206: when the second terminal device checks that the sum of the sampling time lengths of the audio data packets that are buffered and unread in the buffer is greater than the first threshold, the second terminal device reads, from the buffer, the audio data packets that have not been read yet and plays the audio data packets.

207: when the second terminal device checks that the sum of the sampling time lengths of the audio data packets that are buffered and unread in the buffer is less than or equal to the first threshold, the second terminal device may suspend reading and playing, until the sum of the sampling time lengths of the audio data packets that are buffered and unread in the buffer is greater than or equal to the current network jitter estimated value.

In some embodiments of the present disclosure, the jitter risk coefficient $\beta$ may be determined according to the difference between the accumulated actual total playing time length and the accumulated total sampling time length and/or a stalling in audio playing. For example, a larger difference between the accumulated actual total playing time length and total sampling time length indicates a larger jitter risk coefficient $\beta$. Alternatively, a smaller difference between the accumulated actual total playing time length and the accumulated total sampling time length indicates a smaller jitter risk coefficient $\beta$. Alternatively, a larger difference between the accumulated actual total playing time length and the accumulated total sampling time length indicates a smaller jitter risk coefficient $\beta$. Alternatively, a smaller difference between the accumulated actual total playing time length and the accumulated total sampling time length indicates a larger jitter risk coefficient $\beta$.

It can be seen that, in this embodiment, a terminal device accumulates an actual total playing time length and a total sampling time length of audio data packets that currently have been read from a buffer and played; and suspends reading and playing when a sum of sampling time lengths of audio data packets that are buffered and unread in the buffer is less than or equal to a first threshold, until a sum of sampling time lengths of audio data packets in the buffer that are unread is greater than or equal to a current network jitter estimated value, the current network jitter estimated value being obtained based on the accumulated actual total playing time length and the accumulated total sampling time length.

Because an actual total playing time length and a total sampling time length of audio data packets that currently have been read from a buffer and played are accumulated, and a current network jitter estimated value is obtained based on the current accumulated actual total playing time length and the current accumulated total sampling time length, a sum of sampling time lengths buffered during audio buffering is greater than or equal to the current network jitter estimated value.

Because the network jitter estimated value fully considers a network delay cumulative effect, and the network jitter estimated value dynamically changes with the current accumulated actual total playing time length and the current accumulated total sampling time length, it is found through actual practice that, compared with an existing mechanism of buffering according to a fixed time length, such a mechanism helps eliminate impact of accumulative network jitters on fluency of audio playing and on a sound playing delay, and obtains desirable playing experience.

Figure 3:
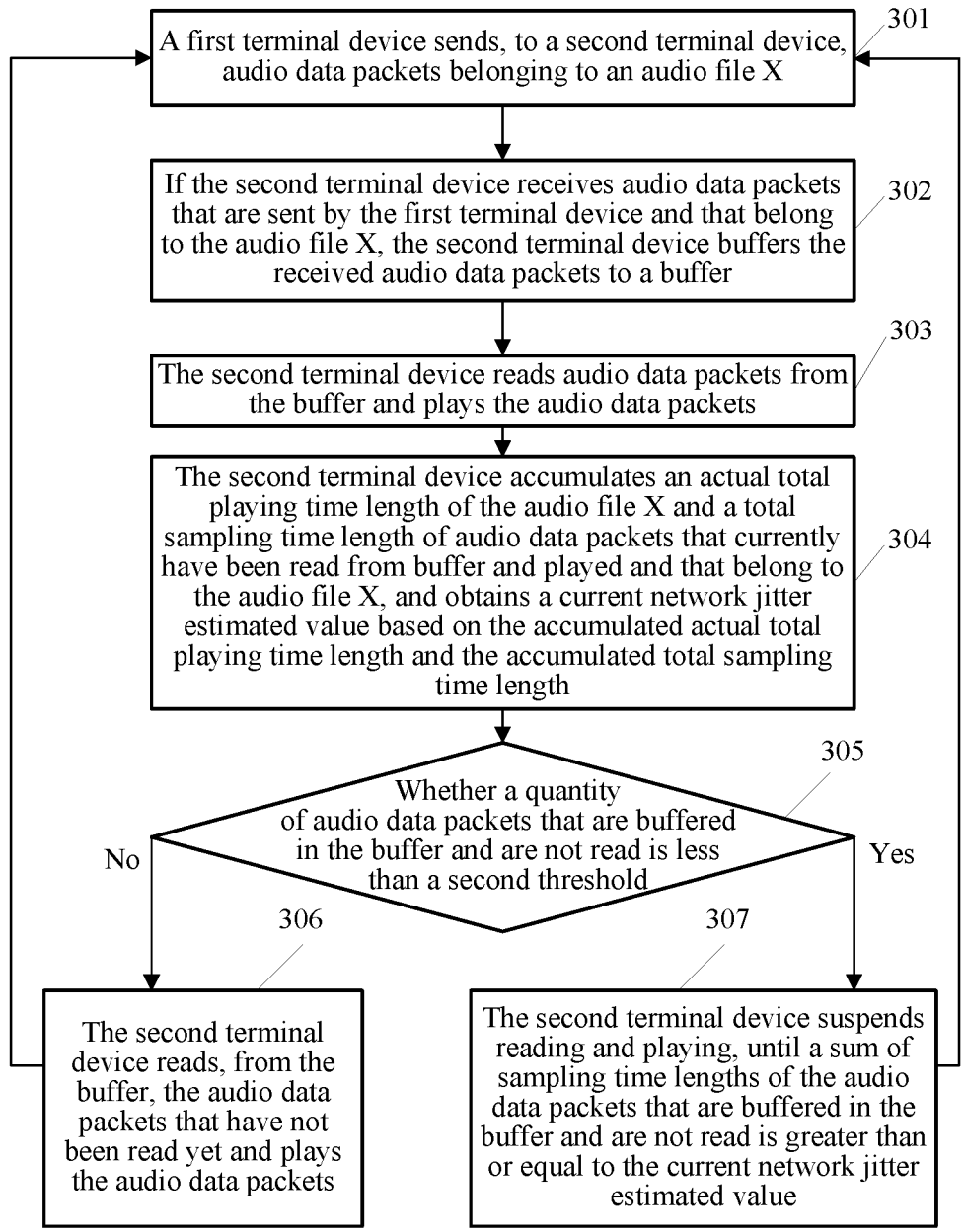
FIG. 3 is a schematic flowchart of another audio processing method according to an embodiment of the present disclosure.

Referring to FIG. 3, FIG. 3 is a schematic flowchart of another audio processing method according to another embodiment of the present disclosure. As shown in FIG. 3, another audio processing method provided in another embodiment of the present disclosure may include the following content:

301: A first terminal device sends, to a second terminal device, audio data packets belonging to an audio file X.

In this embodiment, when a first terminal device needs to, for example, perform instant voice communication or transmit another audio file, by sending audio data packets to a second terminal device, an audio file generally has multiple audio data packets, where the multiple audio data packets may be chronologically sequenced according to sampling moments.

302: when the second terminal device receives audio data packets that are sent by the first terminal device and that belong to the audio file X, the second terminal device buffers the received audio data packets to a buffer.

In some embodiments of the present disclosure, the step of buffering the received audio data packets to a buffer may include: buffering, to the buffer, received audio data packets belonging to a particular audio file (which may be referred to as a first audio file for ease of quotation, where the first audio file may be a live audio file or a non-live audio file).

The terminal devices mentioned in the embodiments of the present disclosure may be personal computers, mobile phones, PDA devices, or terminal devices of other types.

303: The second terminal device reads audio data packets from the buffer and plays the audio data packets.

In some embodiments of the present disclosure, an audio data packet includes a time sequence number indicating time sequence information thereof. In this case, in step 303, audio data packets in the buffer may be chronologically read according to time sequence numbers of the audio data packets.

An audio data packet may be lost or have a large delay during network transmission. In some possible embodiments of the present disclosure, at a moment when a particular audio data packet should be played, it is possible that the audio data packet has not been received yet. In this case, in an actual audio processing process, for example, a null data packet or a mute data packet or another data packet may be inserted at the moment of the audio data packet for transition. That is, when a data packet whose time sequence number ranks in the front has not arrived yet, a null packet may be inserted at the position of the packet that has not arrived for playing.

In some other embodiments of the present disclosure, the audio data packet whose time sequence number ranks in the front may arrive at the buffer after the moment when the audio data packet should be played, and in this case, because the playing moment of the audio data packet has passed, the audio data packet may be read from the buffer and directly discarded rather than played. In an alternative embodiment of the present disclosure, an audio data packet that arrives may be identified, and when a playing moment of the audio data packet has passed, the audio data packet may be directly discarded rather than buffered to the buffer.

304: The second terminal device accumulates an actual total playing time length belonging to the audio file X and a total sampling time length of audio data packets that currently have been read from buffer and played and that belong to the audio file X, and obtains a current network jitter estimated value based on the accumulated actual total playing time length and the accumulated total sampling time length.

In some embodiments of the present disclosure, the step of accumulating, by the second terminal device, an actual total playing time length belonging to the audio file X and a total sampling time length of audio data packets that currently have been read from buffer and played and that belong to the audio file X may specifically include: accumulating an actual total playing time length belonging to the audio file X within a pre-determined time period from a preset moment to a current moment and a total sampling time length of audio data packets belonging to the audio file X that currently have been read from the buffer and played within the pre-determined time period.

In some embodiments of the present disclosure, the step of accumulating, by the second terminal device, an actual total playing time length belonging to the audio file X and a total sampling time length of audio data packets that currently have been read from buffer and played and that belong to the audio file X may specifically include: accumulating an actual total playing time length belonging to the audio file X and a total sampling time length of all audio data packets belonging to the audio file X that currently have been read from the buffer and played within the pre-determined time period.

In some embodiments of the present disclosure, the current network jitter estimated value is equal to a difference between the accumulated actual total playing time length and the accumulated total sampling time length. In an alternative embodiment, the current network jitter estimated value is equal to a multiplication of a jitter risk coefficient $\beta$ and a difference between the accumulated actual total playing time length and the accumulated total sampling time length.

For example, a value of the jitter risk coefficient $\beta$ may range from 0.8 to 1.5. Certainly, the value of $\beta$ may have another range, for example, the value of $\beta$ may be 1, 1.6, 1.7, 1.8, 2, 2.5, 2.8, 3, or any suitable value.

305: The second terminal device checks whether a current quantity of audio data packets that are buffered and unread in the buffer is less than a second threshold.

For example, the second threshold may be equal to 1, 2, 3, 5, 10, 20, or any suitable value.

If not, step 306 is performed.

If yes, step 307 is performed.

306: when the second terminal device checks that the quantity of the audio data packets that are buffered and unread in the buffer is greater than or equal to the second threshold, the second terminal device reads, from the buffer, the audio data packets that have not been read yet and plays the audio data packets.

307: when the second terminal device checks that the quantity of the audio data packets that are buffered and unread in the buffer is less than the second threshold, after a sum of sampling time lengths of audio data packets that are buffered and unread in the buffer is greater than or equal to the current network jitter estimated value, the second terminal device may read, from the buffer, the audio data packets that have not been read yet and play the audio data packets.

In some embodiments of the present disclosure, the jitter risk coefficient $\beta$ may be determined according to the difference between the accumulated actual total playing time length and the accumulated total sampling time length and/or a stalling in audio playing. For example, a larger difference between the accumulated actual total playing time length and total sampling time length indicates a larger jitter risk coefficient β. Alternatively, a smaller difference between the accumulated actual total playing time length and the accumulated total sampling time length indicates a smaller jitter risk coefficient β. Alternatively, a larger difference between the accumulated actual total playing time length and the accumulated total sampling time length indicates a smaller jitter risk coefficient β. Alternatively, a smaller difference between the accumulated actual total playing time length and the accumulated total sampling time length indicates a larger jitter risk coefficient β.

It can be seen that, in this embodiment, a terminal device accumulates an actual total playing time length and a total sampling time length of audio data packets that currently have been read from a buffer and played; and suspends reading and playing when a quantity of audio data packets that are buffered and unread in the buffer is less than a second threshold, until a sum of sampling time lengths of audio data packets in the buffer that are unread is greater than or equal to a current network jitter estimated value, the current network jitter estimated value being obtained based on the accumulated actual total playing time length and the accumulated total sampling time length.

Because an actual total playing time length and a total sampling time length of audio data packets that currently have been read from a buffer and played are accumulated, and a current network jitter estimated value is obtained based on the current accumulated actual total playing time length and the current accumulated total sampling time length, a sum of sampling time lengths buffered during audio buffering is greater than or equal to the current network jitter estimated value.

Because the network jitter estimated value fully considers a network delay cumulative effect, and the network jitter estimated value dynamically changes with the current accumulated actual total playing time length and the current accumulated total sampling time length, it is found through actual practice that, compared with an existing mechanism of buffering according to a fixed time length, such a mechanism helps eliminate impact of accumulative network jitters on fluency of audio playing and on a sound playing delay, and obtains desirable playing experience.

Figure 4:
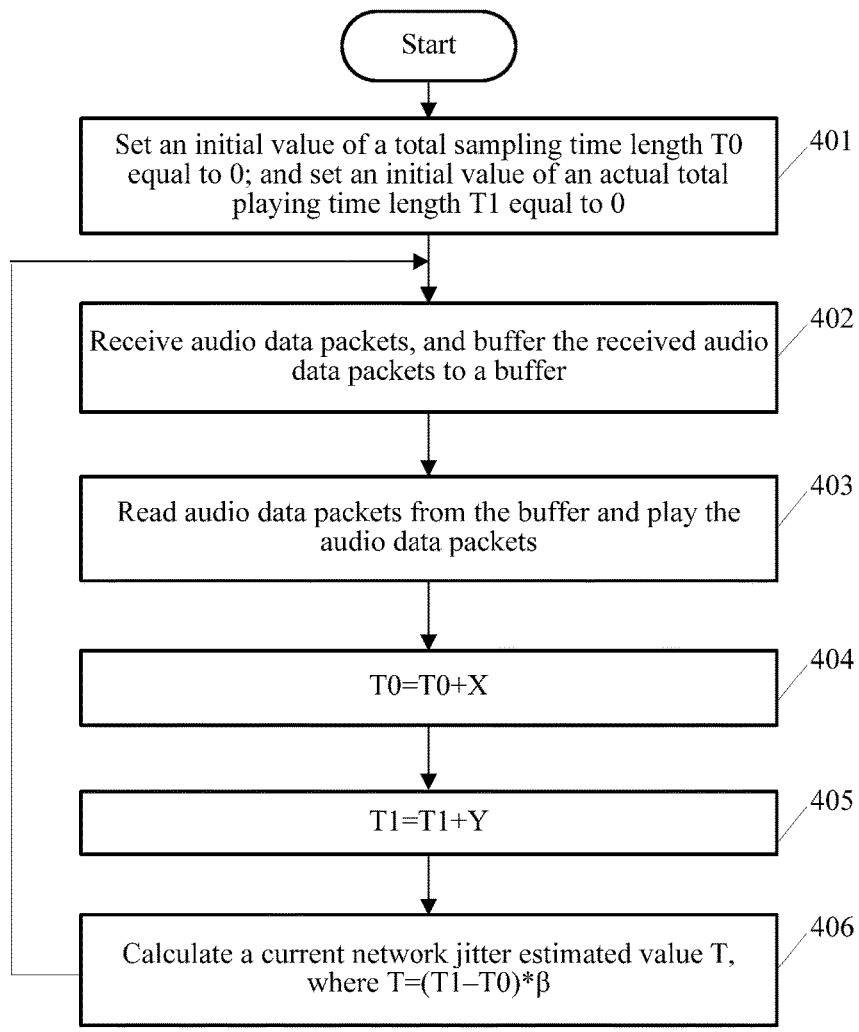
FIG. 4 is a schematic flowchart of a method for calculating a current network jitter estimated value according to an embodiment of the present disclosure.

Referring to FIG. 4, the following gives an example of a specific method for calculating the current network jitter estimated value by the second terminal device:

401: Set an initial value of a total sampling time length T0 equal to 0; and set an initial value of an actual total playing time length T1 equal to 0.

402: Receive audio data packets, and buffer the received audio data packets to a buffer.

403: Read audio data packets from the buffer and play the audio data packets.

In this step, audio data packet reading is performed according to time sequence numbers of audio data packets that are currently played. When a particular audio data packet has not been actually played yet, but a current playing moment is later than a playing moment of the audio data packet, the audio data packet is discarded rather than played.

404: T0=T0+X, where X is sampling time lengths of the read audio data packets.

For example, X may be equal to 1 second, 2 seconds, 3 seconds, or any suitable time length.

405: T1=T1+Y, where Y is actual playing time lengths of the audio data packets.

The actual playing time lengths of the audio data packets may not only include the sampling time lengths of the audio data packets, but also include a sampling time length of a null data packet, a mute data packet, or any suitable data packet that is inserted between a moment when playing of a previous audio data packet is completed and a moment when playing of the audio data packets is completed.

406: Calculate a current network jitter estimated value T, and go back to perform step 402, where $T=(T1-T0)*β$.

The following gives an example of a specific application scenario.

It is assumed that the second terminal device currently receives and plays five audio data packets, and it is currently accumulated that T1=20 and T0=15; and a jitter risk coefficient β is 1.15.

It is calculated according to the formula $T=(T1-T0)*β$ that a current network jitter value is 5.75 seconds. Therefore, after a sum of sampling time lengths of audio data packets that are received and buffered and unread in the buffer is greater than or equal to the current network jitter estimated value 5.75 seconds, the second terminal device may start to read, from the buffer, the audio data packets that are unread and play the audio data packets.

The jitter risk coefficient β may be determined according to network stalling and delay time lengths. For example, a first jitter risk coefficient β1 may be obtained according to a first weight and a network stalling time length, a second jitter risk coefficient β2 may be obtained according to a second weight and a network delay time length, and a sum of the first jitter risk coefficient β1 and the second jitter risk coefficient β2 may be determined as the jitter risk coefficient β. For example, the network stalling time length is 0.8 second, the first weight is set to 0.3, and the network stalling time length is multiplied by the first weight to obtain that the first jitter risk coefficient β1 is 0.24; the network delay time length is 1.3 seconds, the second weight is set to 0.7, and the network delay time length is multiplied by the second weight to obtain that the second jitter risk coefficient β2 is 0.91; and finally, the first jitter risk coefficient β1 and the second jitter risk coefficient β2 are added and 1.15 is obtained, and in this case, the jitter risk coefficient β is 1.15.

In an alternative embodiment, the jitter risk coefficient β may be determined according to an empirical value.

The following further provides a related apparatus configured to implement the foregoing solutions.

Figure 5:
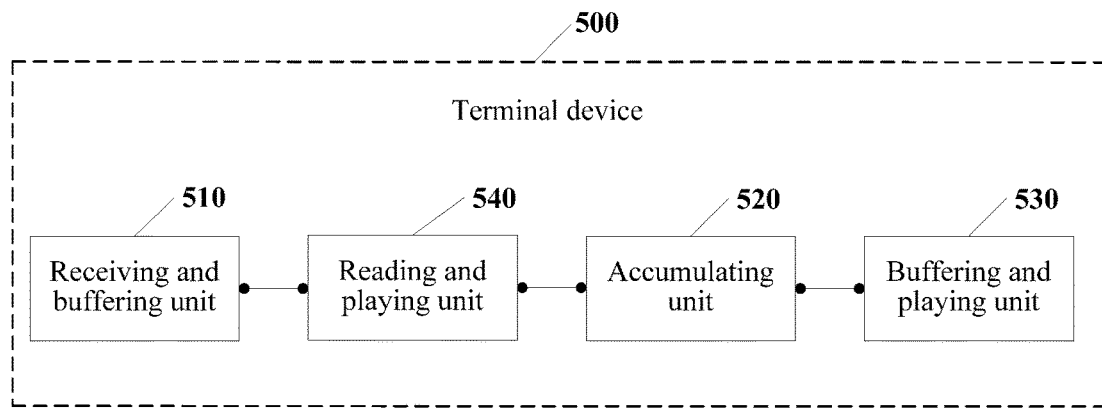
FIG. 5 is a schematic diagram of a terminal device according to an embodiment of the present disclosure.

Referring to FIG. 5, an embodiment of the present disclosure further provides a terminal device 500, which may include: a receiving and buffering unit 510, a reading and playing unit 540, an accumulating unit 520, and a buffering and playing unit 530.

The receiving and buffering unit 510 is configured to buffer received audio data packets to a buffer.

In some embodiments of the present disclosure, the receiving and buffering unit 510 may be specifically configured to buffer, to the buffer, received audio data packets belonging to a particular audio file (which may be referred to as a first audio file for ease of quotation, where the first audio file may be a live audio file or a non-live audio file).

The reading and playing unit 540 is configured to read audio data packets from the buffer and play the audio data packets.

In some embodiments of the present disclosure, an audio data packet includes a time sequence number indicating time sequence information thereof. In this case, the reading and playing unit 540 may chronologically read audio data packets in the buffer according to time sequence numbers of the audio data packets.

An audio data packet may be lost or have a large delay during network transmission. In some possible embodiments of the present disclosure, at a moment when a particular audio data packet should be played, it is possible that the audio data packet has not been received yet. In this case, in an actual audio processing process, for example, a null data packet or a mute data packet or another data packet may be inserted at the moment of the audio data packet for transition. That is, when a data packet whose time sequence number ranks in the front has not arrived yet, a null packet may be inserted at the position of the packet that has not arrived for playing.

In some other embodiments of the present disclosure, the audio data packet whose time sequence number ranks in the front may arrive at the buffer after the moment when the audio data packet should be played, and in this case, because the playing moment of the audio data packet has passed, the reading and playing unit 540 may read the audio data packet from the buffer and directly discard rather than play the audio data packet. In an alternative embodiment of the present disclosure, an audio data packet that arrives may be identified, and when a playing moment of the audio data packet has passed, the audio data packet may be directly discarded rather than buffered to the buffer.

The accumulating unit 520 is configured to accumulate an actual total playing time length and a total sampling time length of audio data packets that currently have been read from the buffer and played.

The buffering and playing unit 530 is configured to suspend reading and playing when a sum of sampling time lengths of audio data packets that are buffered and unread in the buffer is less than or equal to a first threshold, until a sum of sampling time lengths of audio data packets in the buffer that are unread is greater than or equal to a current network jitter estimated value, the current network jitter estimated value being obtained based on the accumulated actual total playing time length and the accumulated total sampling time length.

A sampling time length of an audio data packet is a theoretical playing time length of the audio data packet.

In some embodiments of the present disclosure, the accumulating unit 520 is specifically configured to accumulate an actual total playing time length within a pre-determined time period from a preset moment to a current moment and a total sampling time length of audio data packets that have been read from the buffer and played within the pre-determined time period.

In some other embodiments of the present disclosure, the accumulating unit 520 is specifically configured to accumulate an actual total playing time length belonging to the first audio file and a total sampling time length of all audio data packets that currently have been read from the buffer and played and that belong to the first audio file.

In still some other embodiments of the present disclosure, the accumulating unit 520 is specifically configured to accumulate an actual total playing time length belonging to the first audio file within a pre-determined time period from a preset moment to a current moment and a total sampling time length of all audio data packets belonging to the first audio file that currently have been read from the buffer and played within the pre-determined time period.

In some embodiments of the present disclosure, the accumulating unit 520 is specifically configured to accumulate an actual total playing time length within a pre-determined time period from a preset moment to a current moment and a total sampling time length of audio data packets that have been read from the buffer and played within the pre-determined time period.

In some embodiments of the present disclosure, the buffering and playing unit 530 is specifically configured to buffer, to the buffer, received audio data packets belonging to the first audio file.

The accumulating unit 520 may be specifically configured to accumulate an actual total playing time length belonging to the first audio file and a total sampling time length of all audio data packets that currently have been read from the buffer and played and that belong to the first audio file.

In some embodiments of the present disclosure, the current network jitter estimated value is equal to a difference between the actual total playing time length accumulated by the accumulating unit and the total sampling time length accumulated by the accumulating unit; or the current network jitter estimated value is equal to a multiplication of a jitter risk coefficient $\beta$ and a difference between the actual total playing time length accumulated by the accumulating unit and the total sampling time length accumulated by the accumulating unit.

In some embodiments of the present disclosure, a value of the jitter risk coefficient $\beta$ ranges from 0.8 to 1.5.

For example, a value of the jitter risk coefficient $\beta$ may range from 0.8 to 1.5. Certainly, the value of $\beta$ may have another range, for example, the value of $\beta$ may be 1, 1.6, 1.7, 1.8, 2, 2.5, 2.8, 3, or any suitable value.

For example, the first threshold may be equal to 0 second, 1 second, 2 seconds, 3 seconds, 5 seconds, or any suitable value.

In some embodiments of the present disclosure, the jitter risk coefficient $\beta$ may be determined according to the difference between the accumulated actual total playing time length and the accumulated total sampling time length and/or a stalling in audio playing. For example, a larger difference between the accumulated actual total playing time length and total sampling time length indicates a larger jitter risk coefficient $\beta$. Alternatively, a smaller difference between the accumulated actual total playing time length and the accumulated total sampling time length indicates a smaller jitter risk coefficient $\beta$. Alternatively, a larger difference between the accumulated actual total playing time length and the accumulated total sampling time length indicates a smaller jitter risk coefficient $\beta$. Alternatively, a smaller difference between the accumulated actual total playing time length and the accumulated total sampling time length indicates a larger jitter risk coefficient $\beta$.

It may be understood that, functions of functional modules of the terminal device 500 in this embodiment may be specifically implemented according to the method in the foregoing method embodiment. For specific implementation processes thereof, reference may be made to related descriptions in the foregoing method embodiment, and details are not described herein again.

It can be seen that, the terminal device 500 in this embodiment accumulates an actual total playing time length and a total sampling time length of audio data packets that currently have been read from a buffer and played; and suspends reading and playing, when a current sum of sampling time lengths of audio data packets that are buffered and unread in the buffer is less than or equal to a first threshold, until a sum of sampling time lengths of audio data packets in the buffer that are unread is greater than or equal to a current network jitter estimated value, the current network jitter estimated value being obtained based on the accumulated actual total playing time length and the accumulated total sampling time length.

Because an actual total playing time length and a total sampling time length of audio data packets that currently have been received and read from a buffer and played are accumulated, and a current network jitter estimated value is obtained based on the current accumulated actual total playing time length and the current accumulated total sampling time length, a sum of sampling time lengths buffered during audio buffering is greater than or equal to the current network jitter estimated value.

Because the network jitter estimated value fully considers a network delay cumulative effect, and the network jitter estimated value dynamically changes with the current accumulated actual total playing time length and the current accumulated total sampling time length, it is found through actual practice that, compared with an existing mechanism of buffering according to a fixed time length, such a mechanism helps eliminate impact of a network jitter on fluency of audio playing and on a sound playing delay, and can obtain desirable playing experience.

Figure 6:
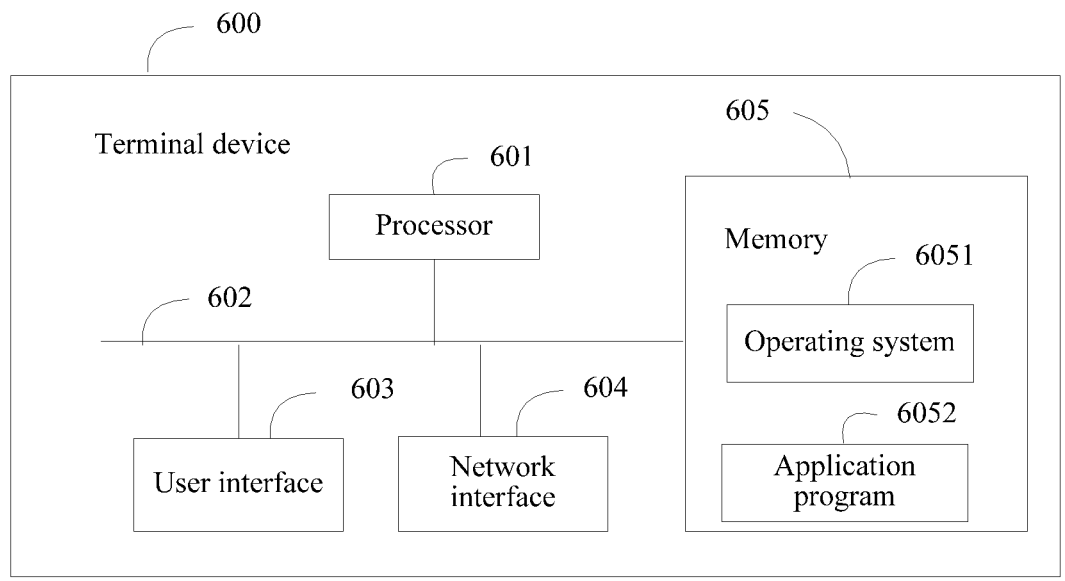
FIG. 6 is a schematic diagram of another terminal device according to an embodiment of the present disclosure.

Referring to FIG. 6, FIG. 6 is a structural block diagram of a terminal device 600 according to another embodiment of the present disclosure.

The terminal device 600 may include: at least one processor 601, at least one network interface 604 or another user interface 603, a memory 605, and at least one communications bus 602. The communications bus 602 is configured to implement connection and communication between the components. The terminal device 600 optionally includes the user interface 603, including: a display (for example, a touchscreen, a liquid crystal display (LCD), a cathode ray tube (CRT), a holographic imager, or a projector), a clicking device (for example, a mouse, a trackball, a touch panel, or a touchscreen), a camera and/or a pickup apparatus, and the like.

The memory 602 may include a read-only memory (ROM) and a random access memory (RAM), and provide an instruction and data for the processor 601. A part of the memory 602 may further include a non-volatile random access memory (NVRAM).

In some embodiments, the memory 605 stores the following elements, executable modules or data structures, or a subset thereof, or an extension set thereof:

an operating system 6051, including various system programs, configured to implement various fundamental services and process hardware-based tasks; and an application program module 6052, including various application programs, configured to implement various application services.

The application program module 6052 includes, but is not limited to, a receiving and buffering unit 510, a reading and playing unit 540, an accumulating unit 520, a buffering and playing unit 530, and any suitable units.

In this embodiment of the present disclosure, by invoking the program or instruction stored in the memory 605, the processor 601 buffers received audio data packets to a buffer; reads audio data packets from the buffer and plays the audio data packets; accumulates an actual total playing time length and a total sampling time length of audio data packets that currently have been read from the buffer and played; and suspends reading and playing, when a current sum of sampling time lengths of audio data packets that are buffered and unread in the buffer is less than or equal to a first threshold, until a sum of sampling time lengths of audio data packets in the buffer that are unread is greater than or equal to a current network jitter estimated value, the current network jitter estimated value being obtained based on the accumulated actual total playing time length and the accumulated total sampling time length.

In some embodiments of the present disclosure, the step of buffering, by the processor 601, received audio data packets to a buffer may include: buffering, to the buffer, received audio data packets belonging to a particular audio file (which may be referred to as a first audio file for ease of quotation, where the first audio file may be a live audio file or a non-live audio file).

A sampling time length of an audio data packet is a theoretical playing time length of the audio data packet.

In some embodiments of the present disclosure, the processor 601 reads the audio data packets from the buffer and plays the audio data packets. The processor 601 may chronologically read the audio data packets in the buffer according to time sequence numbers of the audio data packets.

In some embodiments of the present disclosure, the step of accumulating, by the processor 601, an actual total playing time length and a total sampling time length of audio data packets that currently have been read from the buffer and played may include: accumulating an actual total playing time length within a pre-determined time period from a preset moment to a current moment and a total sampling time length of audio data packets that have been received and read from the buffer and played within the pre-determined time period.

In some other embodiments of the present disclosure, the step of buffering, by the processor 601, received audio data packets to a buffer specifically includes: buffering, to the buffer, received audio data packets belonging to a particular audio file. The step of accumulating, by the processor 601, an actual total playing time length and a total sampling time length of audio data packets that currently have been read from the buffer and played may include: accumulating an actual total playing time length belonging to the first audio file and a total sampling time length of all audio data packets that currently have been read from the buffer and played and that belong to the first audio file.

In still some other embodiments of the present disclosure, the step of buffering, by the processor 601, received audio data packets to a buffer specifically includes: buffering, to the buffer, received audio data packets belonging to a particular audio file. The step of accumulating, by the processor 601, an actual total playing time length and a total sampling time length of audio data packets that currently have been read from the buffer and played may include: accumulating an actual total playing time length belonging to the first audio file within a pre-determined time period from a preset moment to a current moment and a total sampling time length of all audio data packets belonging to the first audio file that currently have been read from the buffer and played within the pre-determined time period.

In some implementation manners of the present disclosure, the current network jitter estimated value is equal to a difference between the accumulated actual total playing time length and the accumulated total sampling time length. Alternatively, the current network jitter estimated value is equal to a multiplication of a jitter risk coefficient $\beta$ and a difference between the accumulated actual total playing time length and the accumulated total sampling time length.

For example, a value of the jitter risk coefficient $\beta$ may range from 0.8 to 1.5. Certainly, the value of $\beta$ may have another range, for example, the value of $\beta$ may be 1, 1.6, 1.7, 1.8, 2, 2.5, 2.8, 3, or any suitable value.

For example, the first threshold may be equal to 0 second, 1 second, 2 seconds, 3 seconds, 5 seconds, or any suitable value.

In some embodiments of the present disclosure, the jitter risk coefficient β may be determined according to the difference between the accumulated actual total playing time length and the accumulated total sampling time length and/or a stalling in audio playing. For example, a larger difference between the accumulated actual total playing time length and total sampling time length indicates a larger jitter risk coefficient β. Alternatively, a smaller difference between the accumulated actual total playing time length and the accumulated total sampling time length indicates a smaller jitter risk coefficient β. Alternatively, a larger difference between the accumulated actual total playing time length and the accumulated total sampling time length indicates a smaller jitter risk coefficient β. Alternatively, a smaller difference between the accumulated actual total playing time length and the accumulated total sampling time length indicates a larger jitter risk coefficient β.

It may be understood that, functions of functional modules of the terminal device 600 in this embodiment may be specifically implemented according to the method in the foregoing method embodiment. For specific implementation processes thereof, reference may be made to related descriptions in the foregoing method embodiment, and details are not described herein again.

It can be seen that, the terminal device 600 in this embodiment accumulates an actual total playing time length and a total sampling time length of audio data packets that currently have been read from a buffer and played; and suspends reading and playing of audio data packets when a sum of sampling time lengths of audio data packets that are buffered and unread in the buffer is less than or equal to a first threshold, until a sum of sampling time lengths of audio data packets in the buffer that are unread is greater than or equal to a current network jitter estimated value, the current network jitter estimated value being obtained based on the accumulated actual total playing time length and the accumulated total sampling time length.

Because an actual total playing time length and a total sampling time length of audio data packets that currently have been read from a buffer and played are accumulated, and a current network jitter estimated value is obtained based on the current accumulated actual total playing time length and the current accumulated total sampling time length, a sum of sampling time lengths buffered during audio buffering is greater than or equal to the current network jitter estimated value.

Because the network jitter estimated value fully considers a network delay cumulative effect, and the network jitter estimated value dynamically changes with the current accumulated actual total playing time length and the current accumulated total sampling time length, it is found through an actual practice that, compared with an existing mechanism of buffering according to a fixed time length, such a mechanism helps eliminate impact of accumulative network jitters on fluency of audio playing and on a sound playing delay, and obtains desirable playing experience.

Figure 7:
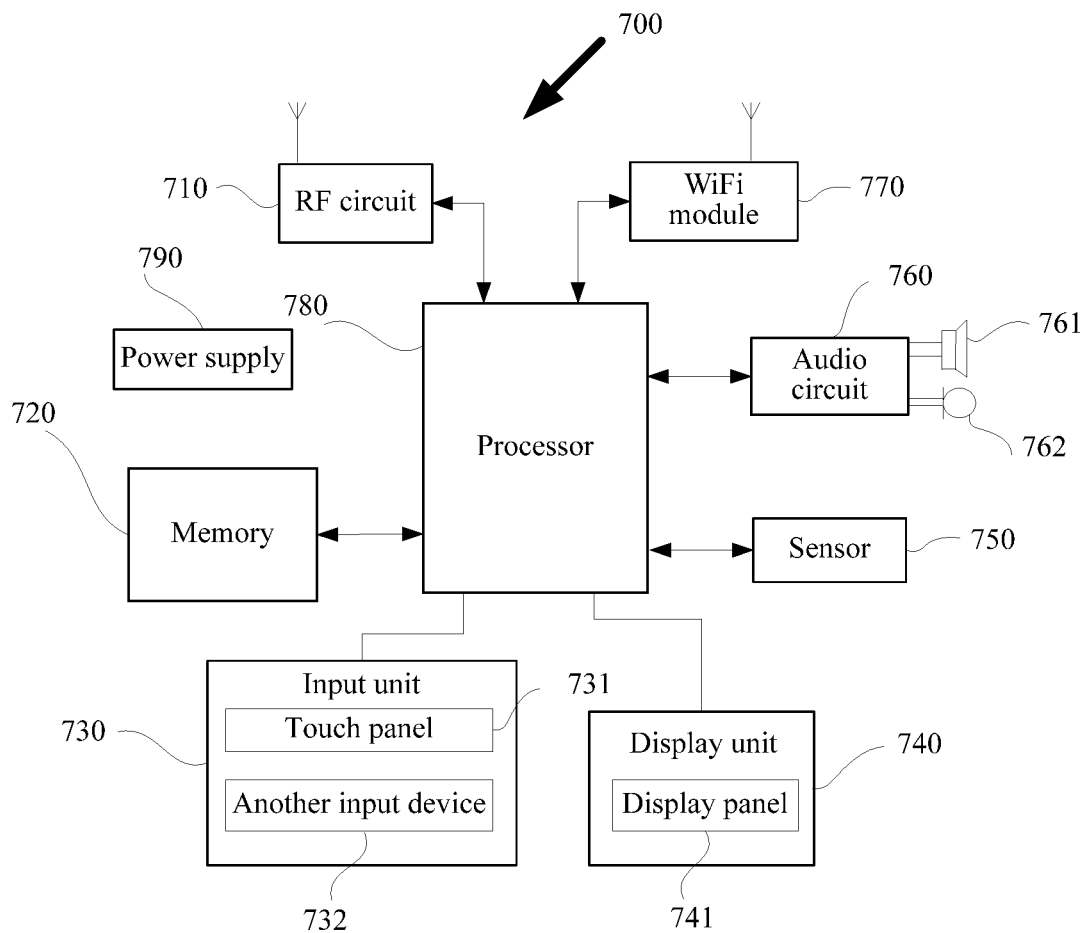
FIG. 7 is a schematic diagram of another terminal device according to an embodiment of the present disclosure.

As shown in FIG. 7, for ease of description, only parts related to the embodiments of the present disclosure are shown. For specific technical details that are not disclosed, refer to the disclosed methods in the embodiments of the present disclosure. A terminal device 700 shown in FIG. 7 may be any terminal device such as a mobile phone, a tablet computer, a PDA, a point of sales (POS), or an in-vehicle computer. That the terminal device 700 is a mobile phone is mainly used as an example below:

FIG. 7 is a block diagram of a part of structure of a mobile phone related to a terminal according to an embodiment of the present disclosure. Referring to FIG. 7, the mobile phone includes: components such as a radio frequency (RF) circuit 710, a memory 720, an input unit 730, a wireless fidelity (WiFi) module 770, a display unit 740, a sensor 750, an audio circuit 760, a processor 780, and a power supply 790.

A person skilled in the art may understand that the structure of the mobile phone shown in FIG. 7 does not constitute a limitation to the mobile phone, and the mobile phone may include more or fewer components than those shown in the figure, or some components may be combined, or a different component deployment may be used.

The following specifically describes the components of the mobile phone with reference to FIG. 7.

The RF circuit 710 may be configured to receive and send signals during an information receiving and sending process or a call process. Particularly, the RF circuit 710 receives downlink information from a base station, then delivers the downlink information to the processor 780 for processing, and sends related uplink data to the base station. Generally, the RF circuit includes, but is not limited to, an antenna, at least one amplifier, a transceiver, a coupler, a low noise amplifier (LNA), a duplexer, and the like. In addition, the RF circuit 710 may also communicate with a network and another device by wireless communication. The wireless communication may use any communications standard or protocol, which includes, but is not limited to, Global System for Mobile communications (GSM), General Packet Radio Service (GPRS), Code Division Multiple Access (CDMA), Wideband Code Division Multiple Access (WCDMA), Long Term Evolution (LTE), e-mail, Short Message Service (SMS), and the like.

The memory 720 may be configured to store a software program and module. The processor 780 runs the software program and module stored in the memory 720, to implement various functional applications and data processing of the mobile phone. The memory 720 may mainly include a program storage area and a data storage area. The program storage area may store an operating system, an application program required by at least one function (such as a sound playback function and an image display function), and the like. The data storage area may store data (such as audio data and an address book) created according to use of the mobile phone, and the like. In addition, the memory 720 may include a high speed random access memory, and may also include a non-volatile memory, such as at least one magnetic disk storage device, a flash memory, or another volatile solid-state storage device.

The input unit 730 may be configured to receive input digit or character information, and generate a keyboard signal input related to the user setting and function control of the mobile phone shown in FIG. 7. Specifically, the input unit 730 may include a touch panel 731 and another input device 732. The touch panel 731, which may also be referred to as a touch screen, may collect a touch operation of a user on or near the touch panel (such as an operation of a user on or near the touch panel 731 by using any suitable object or accessory such as a finger or a stylus), and drive a corresponding connection apparatus according to a preset program. Optionally, the touch panel 731 may include two parts: a touch detection apparatus and a touch controller. The touch detection apparatus detects a touch position of the user, detects a signal generated by the touch operation, and transfers the signal to the touch controller. The touch controller receives the touch information or touch signal from the touch detection apparatus, converts the touch information into touch point coordinates, and sends the touch point coordinates to the processor 780. Moreover, the touch controller can receive and execute a command sent from the processor 780. In addition, the touch panel 731 may be a resistive, capacitive, infrared, or surface sound wave type touch panel. In addition to the touch panel 731, the input unit 730 may further include another input device 732. Specifically, the another input device 732 may include, but is not limited to, one or more of a physical keyboard, a functional key (such as a volume control key or a switch key), a track ball, a mouse, and a joystick.

The display unit 740 may be configured to display information input by the user or information provided for the user, and various menus of the mobile phone. The display unit 740 may include a display panel 741. Optionally, the display panel 741 may be configured by using an LCD, an organic light-emitting diode (OLED), or the like. Further, the touch panel 731 may cover the display panel 741. After detecting a touch operation on or near the touch panel 731, the touch panel 731 transfers the touch operation to the processor 780, so as to determine the type of the touch event. Then, the processor 780 provides a corresponding visual output on the display panel 741 according to the type of the touch event. Although in FIG. 7, the touch panel 731 and the display panel 741 are used as two separate parts to implement input and output functions of the mobile phone, in some embodiments, the touch panel 731 and the display panel 741 may be integrated to implement the input and output functions of the mobile phone.

The terminal device 700 may further include at least one sensor 750, such as an optical sensor, a motion sensor, and other suitable sensors. Specifically, the optical sensor may include an ambient light sensor and a proximity sensor. The ambient light sensor may adjust luminance of the display panel 741 according to brightness of the ambient light. The proximity sensor may switch off the display panel 741 and/or backlight when the mobile phone is moved to the ear. As one type of motion sensor, an acceleration sensor may detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors such as a gyroscope, a barometer, a hygrometer, a thermometer, and an infrared sensor, which may be configured in the mobile phone, are not further described herein.

The audio circuit 760, a speaker 761, and a microphone 762 may provide audio interfaces between the user and the mobile phone. The audio circuit 760 may convert received audio data into an electric signal and transmit the electric signal to the speaker 761. The speaker 761 converts the electric signal into a sound signal for output. On the other hand, the microphone 762 converts a collected sound signal into an electric signal. The audio circuit 760 receives the electric signal and converts the electric signal into audio data, and outputs the audio data to the processor 780 for processing. Then, the processor 780 sends the audio data to, for example, another mobile phone by using the RF circuit 710, or outputs the audio data to the memory 720 for further processing.

WiFi belongs to a short-range wireless transmission technology. The mobile phone may help, by using the WiFi module 770, the user to receive and send e-mails, browse a webpage, access streaming media, and so on, which provides wireless broadband Internet access for the user. Although the WiFi module 770 is shown in FIG. 7, it may be understood that the WiFi module 770 is not a necessary component of the mobile phone, and when required, the WiFi module 770 may be omitted as long as the scope of the essence of the present disclosure is not changed.

The processor 780 is the control center of the mobile phone, and is connected to various parts of the mobile phone by using various interfaces and lines. By running or executing the software program and/or module stored in the memory 720, and invoking data stored in the memory 720, the processor 780 performs various functions and data processing of the mobile phone, thereby performing overall monitoring on the mobile phone. Optionally, the processor 780 may include one or more processing units. Preferably, the processor 780 may integrate an application processor and a modem. The application processor mainly processes an operating system, a user interface, an application program, and the like. The modem mainly processes wireless communication. It may be understood that the foregoing modem may also not be integrated into the processor 780.

The terminal device 700 further includes the power supply 790 (such as a battery) for supplying power to the components.

Preferably, the power supply may be logically connected to the processor 780 by using a power management system, thereby implementing functions such as charging, discharging and power consumption management by using the power management system. Although not shown in the figure, the terminal device 700 may further include a camera, a Bluetooth module, and the like, which are not further described herein.

In the embodiments of the present disclosure, the processor 780 included in the user terminal further has the following functions:

buffering received audio data packets to a buffer; reading audio data packets from the buffer and playing the audio data packets; accumulating an actual total playing time length and a total sampling time length of audio data packets that currently have been read from the buffer and played; and suspending reading and playing, when a current sum of sampling time lengths of audio data packets that are buffered and unread in the buffer is less than or equal to a first threshold, until a sum of sampling time lengths of audio data packets in the buffer that are unread is greater than or equal to a current network jitter estimated value, the current network jitter estimated value being obtained based on the accumulated actual total playing time length and the accumulated total sampling time length.

In some embodiments of the present disclosure, the step of buffering, by the processor 780, received audio data packets to a buffer may include: buffering, to the buffer, received audio data packets belonging to a particular audio file (which may be referred to as a first audio file for ease of quotation, where the first audio file may be a live audio file or a non-live audio file).

A sampling time length of an audio data packet is a theoretical playing time length of the audio data packet.

In some embodiments of the present disclosure, the step of accumulating, by the processor 780, an actual total playing time length and a total sampling time length of audio data packets that currently have been read from the buffer and played may include: accumulating an actual total playing time length within a pre-determined time period from a preset moment to a current moment and a total sampling time length of audio data packets that currently have been read from the buffer and played within the pre-determined time period.

In some other embodiments of the present disclosure, the step of buffering, by the processor 780, received audio data packets to a buffer specifically includes: buffering, to the buffer, received audio data packets belonging to a particular audio file. The step of accumulating, by the processor 780, an actual total playing time length and a total sampling time length of audio data packets that currently have been read from the buffer and played may include: accumulating an actual total playing time length belonging to the first audio file and a total sampling time length of all audio data packets that currently have been read from the buffer and played and that belong to the first audio file.

In still some other embodiments of the present disclosure, the step of buffering, by the processor 780, received audio data packets to a buffer specifically includes: buffering, to the buffer, received audio data packets belonging to a particular audio file. The step of accumulating, by the processor 780, an actual total playing time length and a total sampling time length of audio data packets that currently have been read from the buffer and played may include: accumulating an actual total playing time length belonging to the first audio file within a pre-determined time period from a preset moment to a current moment and a total sampling time length of all audio data packets belonging to the first audio file that currently have been read from the buffer and played within the pre-determined time period.

In some implementation manners of the present disclosure, the current network jitter estimated value is equal to a difference between the accumulated actual total playing time length and the accumulated total sampling time length. Alternatively, the current network jitter estimated value is equal to a multiplication of a jitter risk coefficient β and a difference between the accumulated actual total playing time length and the accumulated total sampling time length.

For example, a value of the jitter risk coefficient β may range from 0.8 to 1.5. Certainly, the value of β may have another range, for example, the value of β may be 1, 1.6, 1.7, 1.8, 2, 2.5, 2.8, 3, or any suitable value.

For example, the first threshold may be equal to 0 second, 1 second, 2 seconds, 3 seconds, 5 seconds, or any suitable value.

In some embodiments of the present disclosure, the jitter risk coefficient β may be determined according to the difference between the accumulated actual total playing time length and the accumulated total sampling time length and/or a stalling in audio playing. For example, a larger difference between the accumulated actual total playing time length and total sampling time length indicates a larger jitter risk coefficient β. Alternatively, a smaller difference between the accumulated actual total playing time length and the accumulated total sampling time length indicates a smaller jitter risk coefficient β. Alternatively, a larger difference between the accumulated actual total playing time length and the accumulated total sampling time length indicates a smaller jitter risk coefficient β. Alternatively, a smaller difference between the accumulated actual total playing time length and the accumulated total sampling time length indicates a larger jitter risk coefficient β.

It may be understood that, functions of functional modules of the terminal device 700 in this embodiment may be specifically implemented according to the method in the foregoing method embodiment. For specific implementation processes thereof, reference may be made to related descriptions in the foregoing method embodiment, and details are not described herein again.

It can be seen that, the terminal device 700 in this embodiment accumulates an actual total playing time length and a total sampling time length of audio data packets that currently have been read from a buffer and played; and suspends reading and playing of audio data packets in the buffer that are unread, when a sum of sampling time lengths of audio data packets that are buffered and unread in the buffer is less than or equal to a first threshold, until a sum of sampling time lengths of audio data packets in the buffer that are unread is greater than or equal to a current network jitter estimated value, the current network jitter estimated value being obtained based on the accumulated actual total playing time length and the accumulated total sampling time length.

Because an actual total playing time length and a total sampling time length of audio data packets that currently have been read from a buffer and played are accumulated, and a current network jitter estimated value is obtained based on the current accumulated actual total playing time length and the current accumulated total sampling time length, a sum of sampling time lengths buffered during audio buffering is greater than or equal to the current network jitter estimated value.

Because the network jitter estimated value fully considers a network delay cumulative effect, and the network jitter estimated value dynamically changes with the current accumulated actual total playing time length and the current accumulated total sampling time length, it is found through actual practice that, compared with an existing mechanism of buffering according to a fixed time length, such a mechanism helps eliminate impact of accumulative network jitters on fluency of audio playing and on a sound playing delay, and obtains desirable playing experience.

An embodiment of the present disclosure further provides a non-transitory computer readable storage medium to store programs and/or instructions thereon, and when executed, the processor performs some or all of the steps in the audio processing method recorded in the foregoing method embodiment.

It should be noted that, for simple description, the foregoing method embodiments are represented as a series of actions, but persons skilled in the art should appreciate that the present disclosure is not limited to the described order of the actions because some steps may be performed in another order or performed simultaneously according to the present disclosure. In addition, a person skilled in the art should also know that the embodiments described in this specification all belong to preferred embodiments, and the involved actions and modules are not mandatory to the present disclosure.

In the foregoing embodiments, the description of each embodiment has respective focuses. For a part that is not described in detail in an embodiment, reference may be made to related descriptions in other embodiments.

In the several embodiments provided in this application, it should be understood that the disclosed apparatus may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in a form of a software product. The computer software product is stored in a storage medium and includes several instructions for instructing a computer device (which may be a personal computer, a server, or a network device) to perform all or some of the steps of the methods in the embodiments of the present disclosure. The foregoing storage medium includes: any medium that can store program code, such as a USB flash drive, a ROM, a RAM, a removable hard disk, a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. An audio processing method, comprising:
   receiving audio data packets;
   buffering the audio data packets to a buffer;
   reading the audio data packets from the buffer and playing the audio data packets;
   accumulating an actual total playing time length and a total sampling time length of the audio data packets that currently have been read from the buffer and have been played; and
   suspending reading and playing, when a current sum of sampling time lengths of the audio data packets that are buffered and unread in the buffer is less than or equal to a first threshold, until a sum of sampling time lengths of the audio data packets in the buffer that are unread is greater than or equal to a current network jitter estimated value, the current network jitter estimated value being obtained based on the accumulated actual total playing time length and the accumulated total sampling time length.

2. The audio processing method according to claim 1, wherein the step of reading includes:
   reading the audio data packets from the buffer according to time sequence numbers.

3. The audio processing method according to claim 1, wherein the step of accumulating includes:
   accumulating the actual total playing time length within a pre-determined time period from a preset moment to a current moment, and accumulating the total sampling time length of the audio data packets that have been read from the buffer and have been played within the pre-determined time period.

4. The method according to claim 1, wherein:
   the step of buffering includes:
   buffering the audio data packets of a first audio file to the buffer; and
   the step of accumulating includes:
   accumulating an actual total playing time length of the first audio file and a total sampling time length of the audio data packets of the first audio file that currently have been read from the buffer and played.

5. The method according to claim 1, wherein:
   the current network jitter estimated value equals to a difference between the accumulated actual total playing time length and the accumulated total sampling time length.

6. The method according to claim 1, wherein:
   the current network jitter estimated value equals to a multiplication of a jitter risk coefficient $\beta$ and a difference between the accumulated actual total playing time length and the accumulated total sampling time length.

7. The method according to claim 6, wherein:
   the jitter risk coefficient $\beta$ ranges from 0.8 to 1.5.

8. The audio processing method according to claim 6, wherein
   the first threshold equals to 0 second.

9. A terminal device, comprising:
   a receiving and buffering unit, configured to receive audio data packets and buffer the audio data packets to a buffer;
   a reading and playing unit, configured to read the audio data packets from the buffer and play the audio data packets;
   an accumulating unit, configured to accumulate an actual total playing time length and a total sampling time length of the audio data packets that currently have been read from the buffer and have been played; and
   a buffering and playing unit, configured to suspend reading and playing when a current sum of sampling time lengths of the audio data packets that are buffered and unread in the buffer is less than or equal to a first threshold, until a sum of sampling time lengths of the audio data packets in the buffer that are unread is greater than or equal to a current network jitter estimated value, the current network jitter estimated value being obtained based on the accumulated actual total playing time length and the accumulated total sampling time length.

10. The terminal device according to claim 9, wherein the reading and playing unit is further configured to read the audio data packets from the buffer according to time sequence numbers.

11. The terminal device according to claim 9, wherein
    the accumulating unit is specifically configured to accumulate the actual total playing time length within a pre-determined time period from a preset moment to a current moment and to accumulate the total sampling time length of the audio data packets that have been read from the buffer and have been played within the pre-determined time period.

12. The terminal device according to claim 9, wherein
the receiving and buffering unit is specifically configured to buffer the audio data packets of a first audio file to the buffer; and
the accumulating unit is specifically configured to accumulate an actual total playing time length of the first audio file and a total sampling time length of the audio data packets of the first audio file that currently have been read from the buffer and played.

13. The terminal device according to claim 9, wherein
the current network jitter estimated value equals to a difference between the accumulated actual total playing time length and the accumulated total sampling time length; or
the current network jitter estimated value equals to a multiplication of a jitter risk coefficient $\beta$ and a difference between the accumulated actual total playing time length and the accumulated total sampling time length.

14. The terminal device according to claim 13, wherein:
the jitter risk coefficient $\beta$ ranges from 0.8 to 1.5.

\* \* \* \* \*